UNITED STATES PATENT OFFICE.

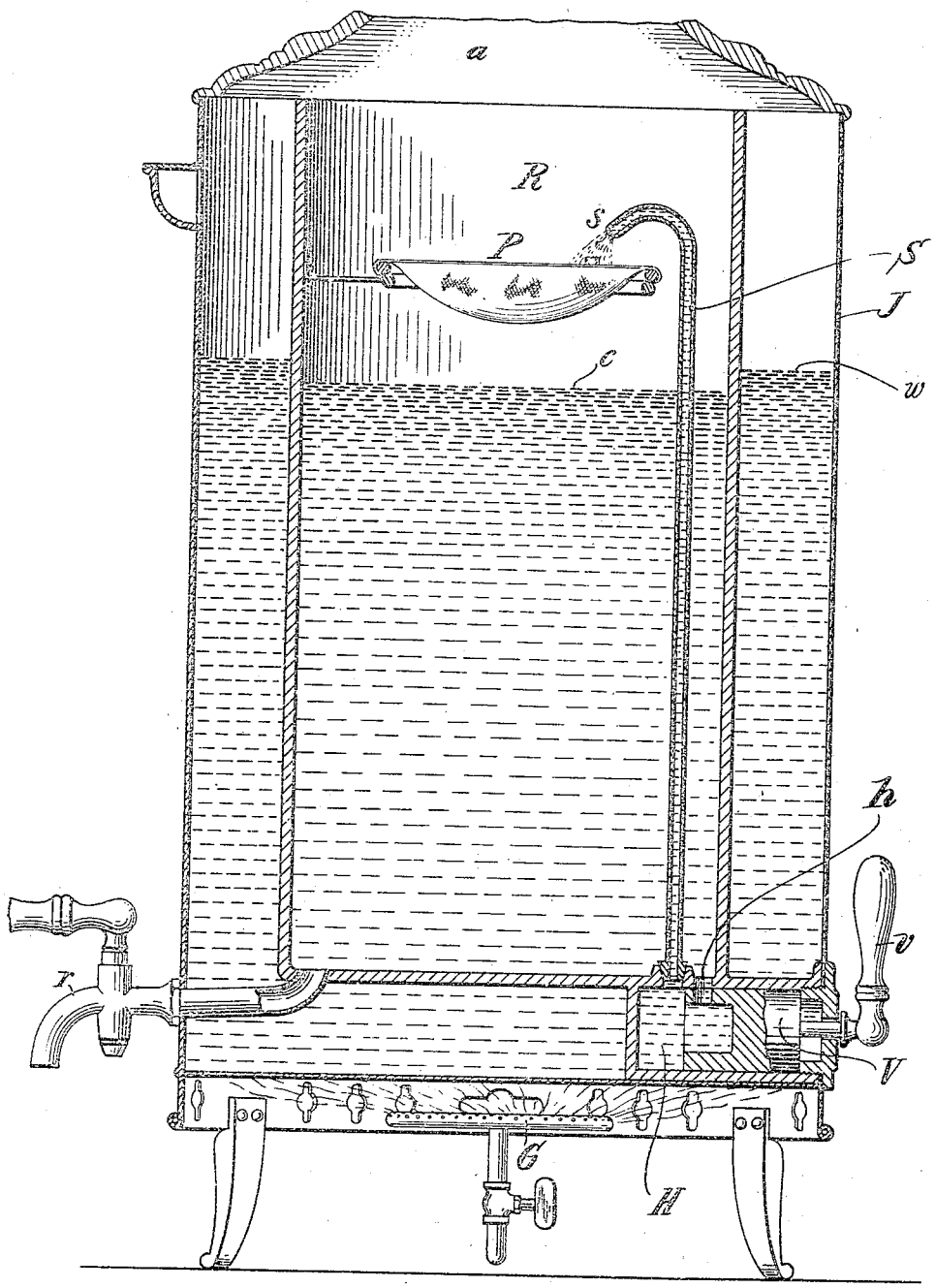

HARRY C. LYONS, OF NEW YORK, N. Y.

COFFEE-URN.

1,251,548.    Specification of Letters Patent.    Patented Jan. 1, 1918.

Application filed December 14, 1916. Serial No. 136,835.

*To all whom it may concern:*

Be it known that I, HARRY C. LYONS, a citizen of the United States, and a resident of the borough of Manhattan, city, county, and State of New York, have invented certain new and useful Improvements in Coffee-Urns, of which the following is a specification.

My improvements relate more particularly to urns used for containing and dispensing hot coffee, as in restaurants and similar places, where storage of immediately available and relatively large quantities of the beverage is a desideratum. The objects of my invention are to provide for automatic circulation of the coffee solution itself through the percolator to intensify infusion, and to control such circulation as found expedient, all as hereinafter fully set forth,—the invention consisting in the specific construction and arrangement of parts described and claimed,—the essential and distinctive feature being the combination with the infusion reservoir of an auxiliary heating chamber communicating therewith in conjunction with a stand pipe arranged to conduct the liquid from said auxiliary or superheating chamber to the percolator in the reservoir, and with means for controlling the automatic circulation thus provided for.

The accompanying drawing is a central vertical sectional elevation of a coffee urn embodying the essential features of my invention.

The coffee reservoir R, is surrounded at sides and bottom by a water jacket J, the level of the water $w$, in which should be at least equal to the level of the coffee solution $c$, in the reservoir. This water jacket J, has no liquid communication whatever with the interior of either the reservoir R, or its supplementary heating chamber H, nor with the coffee solution contained in either. The latter is provided with the usual draw-off faucet $r$; and both the water jacket and reservoir are closed normally by a common lid or cover $a$. The water $w$, in the jacket J, is heated and maintained at the boiling temperature by means of a gas burner G, or equivalent heating expedient, and the only function of this water jacket J, is to heat the coffee solution contained in the reservoir R.

P, is the percolator filter-sieve in which the ground coffee is supported in position above the level of the coffee solution $c$. It may be made of a woven fabric, either textile or metallic, with interstices of a character to facilitate the filtering of the infusion of coffee derived from the injection of liquid into the mass of ground coffee in the percolator sieve P,—the resultant infusion dripping into and diffusing through the liquid $c$, in the lower part of the reservoir R. Hence by the term "percolator" P, as used herein I mean to designate any suitable holder for ground coffee adapted to admit of the solution and filtering thereof.

The injection of liquid into the mass of ground coffee contained in the percolative filter-sieve P, is effected by means of a stand pipe S, communicating at its lower extremity with an auxiliary liquid heating chamber H, at the bottom of the reservoir R, and formed at its upper extremity with a spout $s$, projecting over the edge of the percolator-sieve P, as shown in the drawings. Liquid from the reservoir R, is admitted into the supplementary superheating chamber H, through an inlet port $h$, formed in the bottom of the reservoir R. Provision is thus made for a flow of the cooler portion of the liquid $c$, in the reservoir R, into said superheating chamber H, where owing to the fact that said auxiliary heating chamber H, is exposed to the direct action of the heating means G, the liquid in said supplementary chamber H, will be raised in temperature sufficiently above that in said reservoir to create an automatic circulation of liquid down through the said reservoir R, through said superheating chamber H, up through the stand pipe S, through the percolator sieve P, and back to the body of liquid in the reservoir, thus impregnating the liquid therein with the solution of coffee effected in the said percolator sieve P.

This automatic circulation of the liquid infusion is restricted and controlled as desired by means of a valve V, adapted to regulate communication between the supplementary heating chamber H, the reservoir R, and stand pipe S; and obviously this result may be attained by resort to many mechanical expedients and equivalents, so that I do not wish to confine myself to any particular form and construction of parts in this respect, the essential feature being the regulation of the circulation by means adapted to external manual control. Thus, in the drawings the valve V, is controlled by means of a handle $v$, externally positioned with relation to the urn, so that by an inspection of liquid infusion drawn off through the dispensing faucet $r$, the circulation of the liquid $c$, may be accordingly augmented or lessened, or even stopped temporarily if desired, by a simple manipulation of said handle $v$. Regulated but continuous circulation of the infusion $c$, is however desirable to some extent at least in order to maintain the pungency and aroma thereof; and where the coffee is being dispensed rapidly, and fresh water added frequently to the solution, the control of this circulation becomes an important factor in the continuous and successful use and operation of the urn, which may thus be replenished without resorting to a stoppage or "shut-down".

On the other hand if the circulation of the coffee solution were not thus regulated the solution would become over-changed and rank, while the waste of material involved would be a serious objection to this method of preparing and dispensing the beverage.

It is to be understood in this connection that even though the water $w$, in the jacket $J$, be maintained at the boiling point, there will still be a sufficient relative difference in temperature between the coffee solution in the superheating chamber $H$, and that in the reservoir $R$, to insure the ascent of the hotter portion of solution from said heating chamber $H$, up through the stand pipe $S$, to be replaced by cooler solution from the bottom of the reservoir, and so on continuously, as long as communication obtains between reservoir and heating chamber through the inlet $h$.

The lower end of the stand pipe $S$, is preferably made conical to fit a conical seat formed for it in the floor of the reservoir $R$, so that the said stand pipe may be readily withdrawn or reseated when desired.

By my specific construction and arrangement of parts I thus produce an urn especially adapted to the making, storage and dispensing of coffee as a beverage on a large scale, and in a manner best suited to the requirements of use,—the solution being kept fresh, aromatic and pungent, and of uniform consistency since the circulation tends to maintain strength and to prevent stagnation and settling. It also obviates the necessity for withdrawing the solution through the dispensing faucet $r$, and repouring it through the percolator in order to attain the requisite degree of impregnation or strength; and in this sense the device may be designated as a self-contained apparatus in that its functions are performed internally, although controlled externally.

What I claim as my invention and desire to secure by Letters Patent is,

1. An urn of the character designated, comprising a reservoir for an infusive solution, a supplementary heating and pressure-generating chamber connected with said reservoir by means of an inlet port, a manually-operated valve for governing the communication between said reservoir and the said chamber, a stand pipe in said reservoir communicating with said supplementary heating chamber and adapted to discharge into a percolator, said percolator supported in the reservoir above the level of the infusive solution contained therein, and means for heating said infusive solution in said supplementary heating chamber, whereby an automatic gravity circulation of said infusive solution is attained as and for the purpose set forth.

2. An urn of the character designated, comprising a reservoir for an infusive solution, a supplementary heating and pressure-generating chamber connected with said reservoir by means of an inlet port, a manually-operated valve for governing the communication between said reservoir and the said chamber, a stand pipe in said reservoir communicating with said supplementary heating chamber and adapted to discharge into a percolator, said percolator supported in the reservoir above the level of the infusive solution contained therein, means for heating the said infusive solution in said supplementary heating chamber whereby an automatic circulation of said infusive solution is attained, a water jacket surrounding the bottom and sides of said reservoir, and means for heating a liquid vehicle in said jacket, for the purpose described.

3. An urn of the character designated, comprising a reservoir for an infusive solution, a percolator in the upper portion of said reservoir, a water jacket surrounding said reservoir, a supplementary heating and pressure-generating chamber in the lower portion of said reservoir and communicating therewith by means of an inlet port, said supplementary heating chamber being independent of and out of communication with said water jacket, a manually-operated valve for governing the communication between said reservoir and the said chamber, and a stand pipe connected with said supplementary heating chamber and extended upward to discharge liquid from said supplementary heating chamber to said percolator.

HARRY C. LYONS.

Witnesses:
 DOROTHY MIATT,
 GEO. WM. MIATT.